(12) United States Patent
Sharma

(10) Patent No.: US 12,277,553 B2
(45) Date of Patent: Apr. 15, 2025

(54) BLOCKCHAIN BASED INTERACTION PROCESSING

(71) Applicant: Visa International Service Association, San Francisco, CA (US)

(72) Inventor: Manas Sharma, Singapore (SG)

(73) Assignee: Visa International Service Association, San Francisco, CA (US)

( * ) Notice: Subject to any disclaimer, the term of this patent is extended or adjusted under 35 U.S.C. 154(b) by 636 days.

(21) Appl. No.: 17/487,941

(22) Filed: Sep. 28, 2021

(65) Prior Publication Data

US 2023/0107197 A1 Apr. 6, 2023

(51) Int. Cl.
| | |
|---|---|
| G06Q 20/38 | (2012.01) |
| G06Q 20/40 | (2012.01) |
| H04L 9/00 | (2022.01) |
| H04L 9/32 | (2006.01) |

(52) U.S. Cl.
CPC ....... *G06Q 20/3829* (2013.01); *G06Q 20/401* (2013.01); *H04L 9/3239* (2013.01); *G06Q 2220/00* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 11,295,359 | B1 * | 4/2022 | Mullins | G06Q 20/202 |
| 2018/0341648 | A1 * | 11/2018 | Kakavand | G06Q 20/065 |
| 2019/0087446 | A1 * | 3/2019 | Sharma | H04L 9/3239 |
| 2019/0207770 | A1 * | 7/2019 | Zhou | G06F 21/6209 |

(Continued)

FOREIGN PATENT DOCUMENTS

| | | | | |
|---|---|---|---|---|
| CN | 111292072 A | * | 6/2020 | G06Q 10/10 |
| CN | 113506106 A | * | 10/2021 | G06Q 20/3821 |
| WO | WO-2017145019 A1 | * | 8/2017 | G06Q 20/02 |

OTHER PUBLICATIONS

Nakamoto, Satoshi. "Bitcoin: A Peer-to-Peer Electronic Cash System," white paper, 2010, retrieved from https://web.archive.org/web/20100704213649/http://www.bitcoin.org/bitcoin.pdf on Jul. 4, 2010 (Year: 2010).*

(Continued)

*Primary Examiner* — Eduardo Castilho
(74) *Attorney, Agent, or Firm* — Kilpatrick Townsend & Stockton LLP

(57) ABSTRACT

A method is disclosed. The method includes receiving a first interaction request to transfer a first interaction amount from a sender to a receiver. The first interaction request comprise a sender identifier, a receiver identifier, the first interaction amount, and a condition. The computer generates a smart contract this information, and then hashes the to form a first hash key. The computer incorporates the information, and the first hash key into a first block in a blockchain. The computer receives a second interaction request from the receiver device to transferring a second amount from the receiver to a third party, the second interaction request comprising the receiver identifier, a second interaction amount, and a third party identifier. The computer hashes this information to form a second hash key. The server computer incorporates this information and the second hash key into a second block in the blockchain.

18 Claims, 6 Drawing Sheets

(56) References Cited

U.S. PATENT DOCUMENTS

| | | | | |
|---|---|---|---|---|
| 2019/0228409 | A1* | 7/2019 | Madisetti | G06Q 20/389 |
| 2019/0392438 | A1* | 12/2019 | Rice | G06Q 20/0655 |
| 2020/0042960 | A1* | 2/2020 | Cook | G06Q 20/3829 |
| 2020/0044856 | A1* | 2/2020 | Lynde | G06Q 40/04 |
| 2020/0127843 | A1* | 4/2020 | Webster | G06Q 20/3829 |
| 2020/0143369 | A1* | 5/2020 | Hu | G06F 16/1824 |
| 2020/0273116 | A1* | 8/2020 | Smailey | G06Q 40/12 |
| 2021/0012443 | A1* | 1/2021 | Davison | G06Q 20/389 |
| 2021/0065293 | A1* | 3/2021 | Sigler | G06Q 20/24 |
| 2021/0201318 | A1* | 7/2021 | Wylie | G06Q 20/3829 |
| 2021/0359840 | A1* | 11/2021 | Wang | G06Q 20/065 |
| 2021/0374672 | A1* | 12/2021 | Hunn | G06Q 30/0283 |
| 2022/0358495 | A1* | 11/2022 | Bakshi | G06Q 20/405 |
| 2023/0082470 | A1* | 3/2023 | Kryvoshei | H04L 9/3236 |
| | | | | 713/158 |

OTHER PUBLICATIONS

S. Choudhari, S. Das, S. Parasher and D. Gangwar, "Sub Contractor Life Cycle Management In Enterprise System Using Blockchain Technology," 2021 6th International Conference for Convergence in Technology (I2CT), Maharashtra, India, 2021, pp. 1-7, doi: 10.1109/I2CT51068.2021.9417981 (Year: 2021).*

Hamledari et al., Hesam et al. "Construction Payment Automation Using Blockchain-Enabled Smart Contracts and Reality Capture Technologies," arXiv [Cs.CR], 2021, http://arxiv.org/abs/2010.15232. arXiv. (Year: 2021).*

Machine Translation of Foreign Reference CN 111292072 A1 (Espacenet) (Year: 2020).*

Machine Translation of Foreign Reference CN 113506106 A1 (Espacenet) (Year: 2021).*

O. Ersoy, Z. A. Genç, Z. Erkin and M. Conti, "Practical Exchange for Unique Digital Goods," 2021 IEEE International Conference on Decentralized Applications and Infrastructures (DAPPS), United Kingdom, 2021, pp. 49-58, doi: 10.1109/DAPPS52256.2021.00011. (Year: 2021).*

M. Payeras-Capella, M. Mut-Puigserver and M. A. Cabot-Nadal, "Smart Contract for Multiparty Fair Certified Notifications," 2018 Sixth International Symposium on Computing and Networking Workshops (CANDARW), Takayama, Japan, 2018, pp. 459-465, doi: 10.1109/CANDARW.2018.00089 (Year: 2018).*

M. Payeras-Capella, M. Mut-Puigserver and M. A. Cabot-Nadal, "Blockchain-Based System for Multiparty Electronic Registered Delivery Services," in IEEE Access, vol. 7, pp. 95825-95843, 2019, doi: 10.1109/ACCESS.2019.2929101 (Year: 2019).*

V. Mehta and S. More, "Smart Contracts: Automated Stipulations on Blockchain," 2018 International Conference on Computer Communication and Informatics (ICCCI), Coimbatore, India, 2018, pp. 1-5, doi: 10.1109/ICCCI.2018.8441347. (Year: 2018).*

Al-Farsi et al., "Security of Blockchain-Based Supply Chain Management Systems: Challenges and Opportunities," Appl. Sci., 2021, 11, 5585, https:/ / doi.org/10.3390/app11125586; pp. 1-29.

Zhu et al., "Research on Blockchain Application for E-Commerce, Finance and Energy," 2019 IOP Conf. Ser.: Earth Environ. Sci. 252 042126; 7 pages.

* cited by examiner

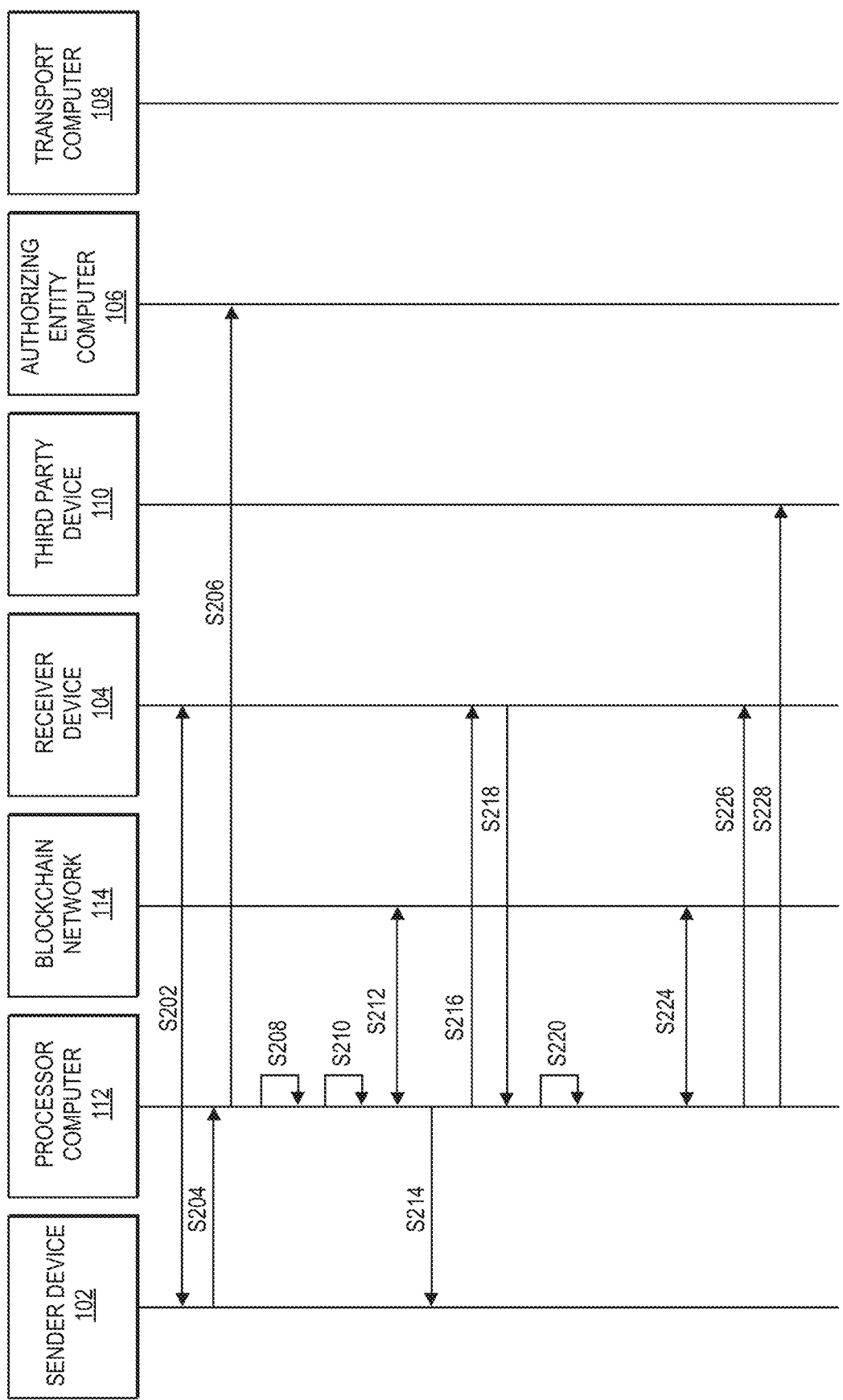

BLOCKCHAIN BASED INTERACTION PROCESSING

CROSS-REFERENCES TO RELATED APPLICATIONS

None.

BACKGROUND

One type of interaction is a transaction in which one person who might be the recipient of a particular product or service of another person. The circumstances may require, however, that the person seeking the product or service provide value to the other person before the product or service is received.

One problem with this type of interaction is that the person that is allegedly supposed to provide the product or service may have fraudulent intent and may not provide the product or service. In another scenario, the person that is supposed to provide the product or service does not do so in a manner that satisfies the expectations of the person that is to receive the product or service. In both cases, the person providing the funds may not have received the expected product or service, but already paid for it. If the person receiving the funds withdraws the funds or closes their account shortly after receiving the funds, the sender of the funds will lose their funds.

Escrows can be used to protect the person that is to receive the product or service. However, if funds are in escrow, then the person providing the product or service is unable to use those funds. This can also be problematic.

Embodiments of the invention address these and other problems individually and collectively.

BRIEF SUMMARY

One embodiment of the invention is directed to a method comprising: a) receiving, by a computer, a first interaction request to transfer a first interaction amount from a sender operating a sender device to a receiver operating a receiver device, the sender having a sender account at a sender financial institution and the receiver having a receiver account at a receiver financial institution, the first interaction request comprising a sender identifier associated with the sender, a receiver identifier associated with the receiver, and the first interaction amount, and a condition; b) generating, by the computer, a smart contract using the sender identifier, the receiver identifier, and the first interaction amount, and the condition; c) hashing, by the computer, at least the sender identifier, the receiver identifier, the first interaction amount, and the condition to form a first hash key; d) incorporating, by the computer, the smart contract, the sender identifier, the receiver identifier, and the first interaction amount, the condition, and the first hash key into a first block in a blockchain; e) receiving, by the computer, a second interaction request from the receiver device, the second interaction request transferring a second interaction amount from the receiver to a third party, the second interaction request comprising the receiver identifier, the second interaction amount, and a third party identifier; f) hashing, by the computer, at least the receiver identifier, the third party identifier, and the second interaction amount, to form a second hash key; and g) incorporating, by the computer, the receiver identifier, the third party identifier, and the second interaction amount, and the second hash key into a second block in the blockchain, wherein steps e), f), and g) occur before the condition is fulfilled.

Another embodiment of the invention is directed to a computer comprising: a processor; and a non-transitory computer readable medium, the computer readable medium comprising code, executable by the processor for implementing operations comprising: a) receiving a first interaction request to transfer a first interaction amount from a sender operating a sender device to a receiver operating a receiver device, the sender having a sender account at a sender financial institution and the receiver having a receiver account at a receiver financial institution, the first interaction request comprising a sender identifier associated with the sender, a receiver identifier associated with the receiver, and the first interaction amount, and a condition; b) generating a smart contract using the sender identifier, the receiver identifier, and the first interaction amount, and the condition; c) hashing at least the sender identifier, the receiver identifier, the first interaction amount, and the condition to form a first hash key; d) incorporating the smart contract, the sender identifier, the receiver identifier, and the first interaction amount, the condition, and the first hash key into a first block in a blockchain; e) receiving a second interaction request from the receiver device, the second interaction request transferring a second interaction amount from the receiver to a third party, the second interaction request comprising the receiver identifier, the second interaction amount, and a third party identifier; f) hashing at least the receiver identifier, the third party identifier, and the second interaction amount, to form a second hash key; and g) incorporating the receiver identifier, the third party identifier, and the second interaction amount, and the second hash key into a second block in the blockchain, wherein steps e), f), and g) occur before the condition is fulfilled.

Another embodiment of the invention includes a system comprising: A system comprising: a processor computer comprising a processor, and a non-transitory computer readable medium, the computer readable medium comprising code, executable by the processor for implementing operations comprising a) receiving a first interaction request to transfer a first interaction amount from a sender operating a sender device to a receiver operating a receiver device, the sender having a sender account at a sender financial institution and the receiver having a receiver account at a receiver financial institution, the first interaction request comprising a sender identifier associated with the sender, a receiver identifier associated with the receiver, and the first interaction amount, and a condition, b) generating a smart contract using the sender identifier, the receiver identifier, and the first interaction amount, and the condition, c) hashing at least the sender identifier, the receiver identifier, the first interaction amount, and the condition to form a first hash key, d) incorporating the smart contract, the sender identifier, the receiver identifier, and the first interaction amount, the condition, and the first hash key into a first block in a blockchain; e) receiving a second interaction request from the receiver device, the second interaction request transferring a second interaction amount from the receiver to a third party, the second interaction request comprising the receiver identifier, the second interaction amount, and a third party identifier; f) hashing at least the receiver identifier, the third party identifier, and the second interaction amount, to form a second hash key; and g) incorporating the receiver identifier, the third party identifier, and the second interaction amount, and the second hash key into a second block in the blockchain, wherein steps e), f), and g) occur before the condition is fulfilled.

Further details regarding embodiments of the invention can be found in the Detailed Description and the Figures.

BRIEF DESCRIPTION OF THE DRAWINGS

FIGS. 2A-2B shows a flow diagram illustrating methods according to embodiments of the invention.

DETAILED DESCRIPTION

Figure 1:
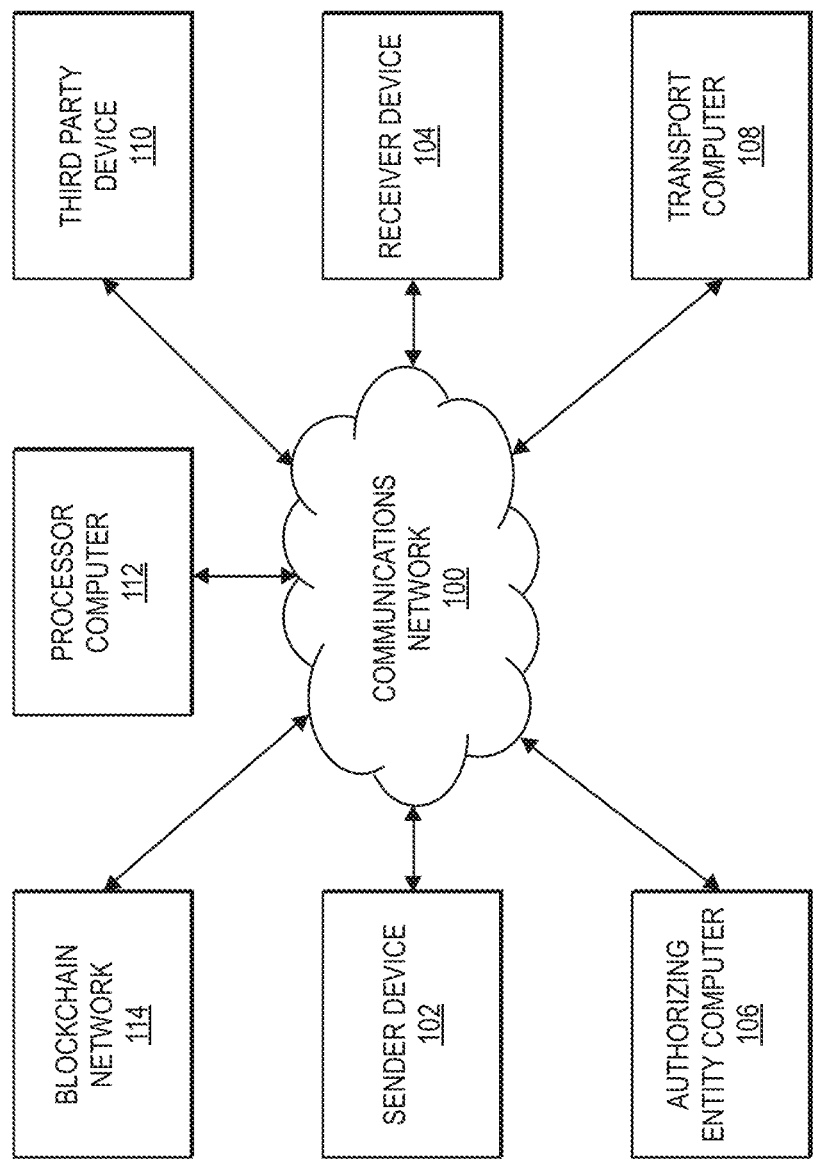
FIG. 1 shows a block diagram of a system according to an embodiment.

Prior to discussing embodiments of the invention, some terms can be described in further detail.

A "key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include an encryption key that may be shared openly and publicly. The public key may be designed to be shared and may be configured such that any information encrypted with the public key may only be decrypted using an private key associated with the public key (i.e., a public/private key pair).

A "private key" may include any encryption key that may be protected and secure. A private key may be securely stored at an entity and may be used to decrypt any information that has been encrypted with an associated public key of a public/private key pair associated with the private key.

A "public/private key pair" may refer to a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. In some embodiments, the public key may be authorized by a body known as a Certification Authority (CA) which stores the public key in a database and distributes it to any other entity which requests it. In some embodiments, the public key may be generated by another entity. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on Rivest-Shamir-Adleman (RSA) or elliptic curve cryptography (ECC).

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be an example of "transport computer".

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "user device" may be any suitable device that can interact with a user (e.g., a payment card or mobile phone). A user device may communicate with or may be at least a part of an access device or a server computer. User devices may be in any suitable form. Some examples of user devices include mobile communication devices such as cellular phones, personal computers (PCs), tablet PCs, wearable devices (e.g., smart watches), vehicles with communication capabilities (e.g., smart cars), etc.

A "mobile communication device" may comprise any electronic device that may be transported and operated by a user, which may also optionally provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile communication device may comprise any suitable hardware and software for performing such functions, and may also include multiple devices or components (e.g. when a device has remote access to a network by tethering to another device—i.e. using the other device as a modem-both devices taken together may be considered a single mobile communication device).

A "user" may include an individual. In some embodiments, a user may be associated with one or more personal accounts and/or user devices.

A "blockchain" can be a distributed database that maintains a continuously-growing list of records secured from tampering and revision. A blockchain may include a number of blocks of interaction records recorded on one or more nodes. Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a blockchain network.

A "smart contract" can be a self-executing contract with the terms of the agreement between buyer and seller being directly written into lines of code. The code and the agreements contained therein exist across a distributed, decentralized blockchain network. The code controls the execution, and transactions are trackable and irreversible. In some embodiments, smart contracts permit trusted transactions and agreements to be carried out among disparate, anonymous parties without the need for a central authority, legal system, or external enforcement mechanism.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

FIG. 1 shows a block diagram of a system according to some embodiments. The system comprises a sender device 102 operated by a sender and a receiver device 104 operated by a receiver, and a third party device 110 operated by a third party, which may all communicate with each other via a communications network 100. The sender device 102, the receiver device 104, and the third party device 110 may be examples of user devices.

The sender may have an account with a financial institution such as an authorizing entity that operates an authorizing entity computer 106, and the receiver may have an account with an financial institution (e.g., an acquirer or another authorizing entity) associated with a transport computer 108. The third party operating the third party device 110 could have an account associated with either the authorizing entity computer 106, the transport computer 108, and/or the processor computer 112.

The sender device 102 and the receiver device 104 may also communicate with a processor computer 112. The processor computer 112, as well as the other devices and computers shown in FIG. 1 may communicate with a blockchain network 114. The blockchain network 114 may include one or more computers that stores a blockchain. In some embodiments, the processor computer 112 may be part of the blockchain network 114, or it could be separate from it. The processing computer 112 may also have an account and it may be maintained by any of the authorizing entity computer 106 or the transport computer 108, or some other computer.

For simplicity of illustration, a certain number of components are shown in FIG. 1. It is understood, however, that embodiments of the invention may include more than one of each component.

The components in FIG. 1 may be in operative communication with each other through any suitable communication channel or communications network such as the communications network 100. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

The blockchain in the blockchain network 114 may store data relating to interactions between different users of different user devices. It may also store smart contracts relating to interactions between different users of different user devices, and such smart contracts can manage interactions between the different users of the different users devices. The blockchain network 114 can be a public or private blockchain network.

In some embodiments, the processor computer 112 may be part of a payment processing network. A payment processing network can be configured to provide authorization services, and clearing and settlement services for payment transactions. A processing network computer may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet.

Figure 2B:
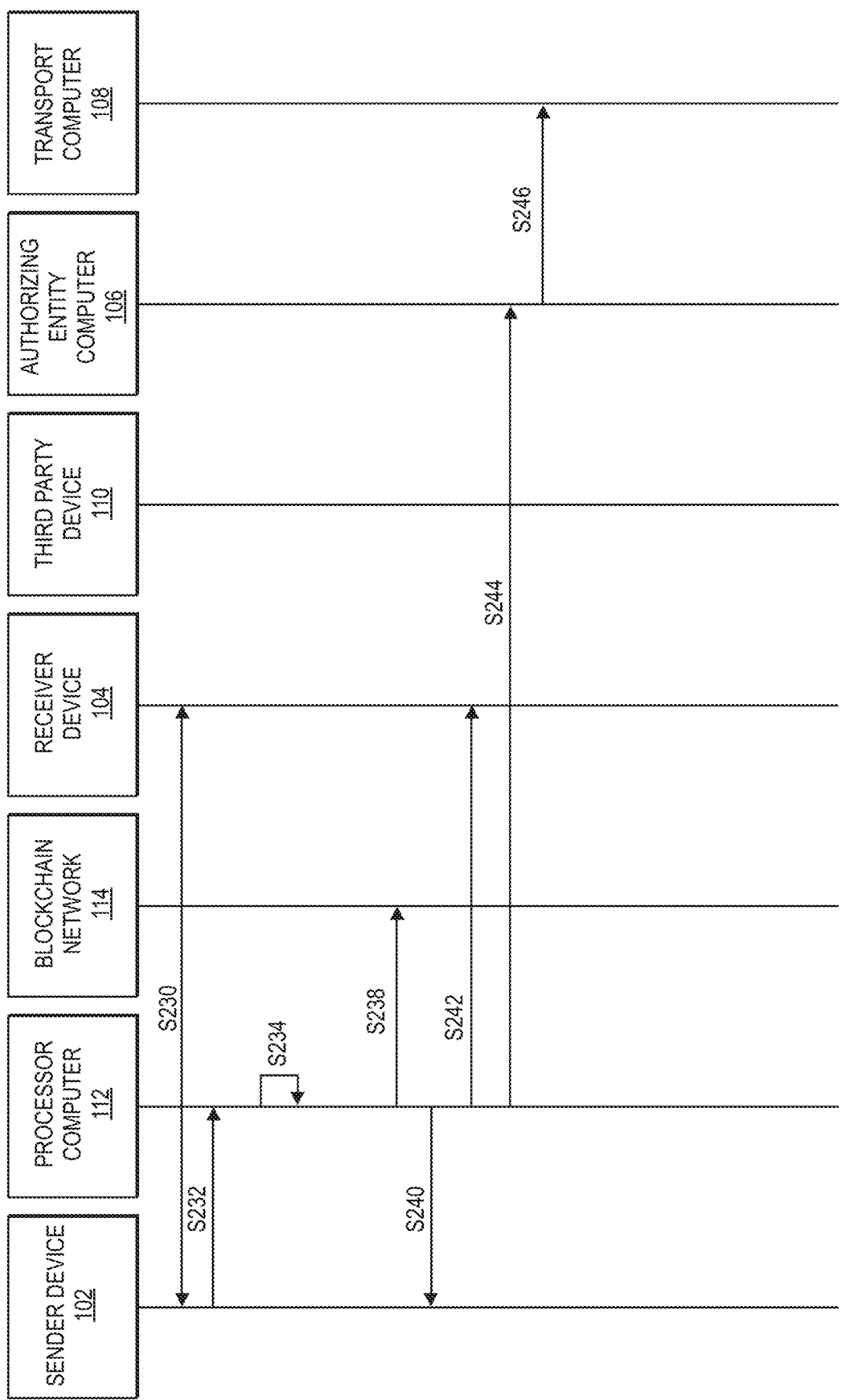

FIGS. 2A-2B illustrate methods according to embodiments of the invention.

At step S202, a sender operating a sender device 102 and a receiver operating a receiver device 104 can agree to interact or transact with each other, and may communicate with each other via the sender device 102 and the receiver device 104. As an illustration, the receiver may agree to provide services that will be provided by the sender. However, the receiver wishes to be paid in advance before providing the services to the sender. In some embodiments, each of the sender device 102 and the receiver device 104 may have applications that allow the sender device 102 and the receiver device 104 to communicate with other user devices. In some embodiments, the processor computer 112 could include an application server that services the applications.

At step S204, the sender operating the sender device 102 can initiate communication with the processor computer 112 to initiate the generation of a smart contract using a first interaction request. The sender device 102 can establish communication with the processor computer 112, and can provide details for the smart contract to the processor computer 112. Such details may include a sender identifier, a receiver identifier, a transaction amount, and any condition(s) associated with the transaction. In some embodiments, the details may also be signed using a private key on the sender device 102 and may be verified by the processor computer 112, or the computers in the blockchain network 114 using a public key associated with the private key on the sender device 102.

The processor computer 112 can then receive the first interaction request from the sender device 102. The first interaction request can be a request to transfer an interaction amount from a sender operating a sender device 102 to a receiver operating a receiver device 104, and also include the details to form the smart contract. For example, the first interaction request can comprise the sender identifier associated with the sender, the receiver identifier associated with the receiver, and a first interaction amount, and one or more conditions.

The condition(s) may be related to an action to be performed by one of the parties of the contract and/or may relate to a time period or other external event. The satisfaction of the condition(s) may allow the receiver to withdraw any funds from the original transaction amount that may be remaining. Examples of conditions might include receipt of a communication from the sender or receiver regarding the sender's satisfaction of goods and/or services provided by the receiver, expiration of a time period or the occurrence of some other external event, include receipt of a communication from the sender or the receiver regarding the sender's receipt of goods and/or services provided by the receiver.

The sender and receiver identifiers can be in any suitable form. In some embodiments, the sender and receiver identifiers can be public keys associated with private keys that are stored on the respective sender and receiver devices. In other embodiments, the sender and receiver identifiers could alternatively include alphanumeric identifiers that are unique to the sender and the receiver, respectively. In some embodiments, the sender and receiver identifiers can include public keys that would be for conducting transactions on the blockchain, and also traditional account identifiers that would be associated with conventional fiat currency accounts, respectively. Traditional account identifiers could be associated with financial institutions such as issuers and acquirers. This information may be stored for each user (e.g., a receiver, sender, third party, etc.) in the processor computer 112.

At step S206, the processor computer 112 can transmit a notification to the authorizing entity computer 106 to place a hold on the account of the sender of the sender device 106. The account of the sender of the sender device 106 can be a bank account, a credit card account, a debit card account, or any other suitable account. The account preferably operates using fiat currency. The hold can prevent the sender from spending the funds in the account that have been already paid to the receiver.

At step S208, the processor computer 112 can add an amount of digital currency (e.g., cryptocurrency) to an account associated with the receiver of the receiver device 104 equal to the transaction amount and the amount that was placed on hold in response to the notification sent in step S206. In some embodiments, the source of the digital currency used to fund the receiver's digital currency account can come from a digital currency fund maintained by the processor computer 112. For example, if $500 dollars is to be transferred from the sender to the receiver, then an equivalent of $500 digital dollars may be transferred to a digital account of the receiver maintained by the processor computer 112. The processor computer 112 then generate a transaction identifier for the first interaction, and a smart contract identifier for the smart contract. The processor computer 112 can then generate the smart contract using at least the sender identifier, the receiver identifier, and the interaction amount, and the condition. The first interaction identifier can also be part of the smart contract.

The smart contract can be a program that can govern the behavior of the receiver and the sender. In some embodiments, it can have automatic timers that can automatically keep track of certain types of actions that the receiver and/or the sender need to perform in the first interaction.

At step S210, the processor computer 112 can hash at least the sender identifier, the receiver identifier, the interaction amount, the transaction identifier, and the condition using a hash function to form a first hash key. The hash function may include any suitable hash function including SHA-1, SHA-2, SHA-256, etc.

At step S212, the processor computer 112 can incorporate the smart contract and the first hash key into a first block in the blockchain. The processor computer 112 can provide some or all of the details that were provided by the sender device 102 to the blockchain network 114, along with the first hash key that was generated by the processor computer 112. In some embodiments, the digital signature provided by the sender device 102 to the processor computer 112 may be sent to the blockchain network 114, and it may be verified by the computers in the blockchain network 114 computers before incorporating smart contract and other details of the first interaction into a block in the blockchain maintained by the blockchain network 114.

The blockchain network 114 may incorporate the smart contract and the first interaction details into a block of transactions and may validate the block before making it part of the official blockchain. Validation schemes may include known mining techniques or known consensus protocols.

At step S214, the processor computer 112 can notify the sender device 102 that the smart contract and the hash key have been created, and have been incorporated into the blockchain in the blockchain network.

At step S216, the processor computer 112 can notify the receiver device 102 that the smart contract and the hash key have been created, and have been incorporated into the blockchain in the blockchain network.

Once the smart contract and the first hash key are recorded to the blockchain network 114, the transaction record including them is immutable and cannot be changed. At this point, the sender or the sender device 102 is waiting for a particular condition to be satisfied. During this time, the receiver operating the receiver device 104 is unable to withdraw any funds associated with the first interaction until the condition has been satisfied. However, the receiver of the receiver device 104 is able to spend the digital currency in the receiver's digital currency account. The receiver operating the receiver device 104, however, is not able to withdraw any of the funds (e.g., fiat currency) associated with the interaction amount until the condition has been satisfied.

Prior to the condition being satisfied, the receiver of the receiver device 104 may wish to pay a third party operating the third party device 110 for a service or good provided by the third party to the receiver. The receiver may advantageously do so, even if the condition of the first interaction has not yet been satisfied.

The receiver device 104 may formulate a second interaction request which requests that a payment be made from the receiver to the third party. In some embodiments, the second interaction request may be signed with a private key on the receiver device 104. The second interaction request may include information including a receiver identifier, a third party identifier, and a second interaction amount. If an explicit link is desired between the second interaction request and the first interaction request, the first interaction identifier and/or the first hash key may be included in the second interaction request as additional data.

At step S218, the receiver device 104 can transmit the second interaction request to the processing computer 112, along with any suitable digital signature. The processing computer 112 can receive the second interaction request and the digital signature from the receiver device 104, and can validate the digital signature with a public key associated with the private key.

At step S220, the processor computer 112 can hash at least the third party identifier, the receiver identifier, and the second interaction amount to form a second hash key. The first interaction identifier and/or the first hash may optionally be hashed along with the third party identifier, the receiver identifier, and the second interaction amount to form the second hash key.

At step S224, the processor computer 112 can incorporate the receiver identifier, the third party identifier, and the second interaction amount, and the second hash key into a second block in the blockchain in the blockchain network 114 (similar to step S212). The blockchain network 114 can perform any suitable transaction verification protocols to ensure that receiver of the receiver device 104 has sufficient funds in the receiver's digital account to pay for the second interaction.

At step S226, the processor computer 112 can notify the receiver device 102 that the second interaction request has been recorded to the blockchain and that a second hash key has been created.

At step S228, the processor computer 112 can notify the third party device 110 that the second interaction request has been recorded to the blockchain and that a second hash key has been created.

In some embodiments, after paying the third party with digital currency in the second interaction, the receiver of the receiver device 104 may optionally perform additional transactions with other parties using the receiver's digital currency account prior to the condition being satisfied.

In step S230, at some point in time after the first interaction takes place, the receiver operating the receiver device 104 will satisfy the condition associated with the smart contract in step S230. In some embodiments, the receiver of the receiver device 104 can notify the sender of the sender device 102 (or vice-versa) that the condition has been fulfilled. For example, the sender device 102 can send a message to the receiver device 104 that any goods that were promised to the receiver have been shipped.

At step S232, after the sender confirms that the condition has been satisfied, the sender of the sender device 102 can notify the processing computer 112 that the condition has been satisfied, and that the first interaction has been completed. The notification may also include a digital signature of the message by the sender device.

At step S234, after the processor computer 112 receives the notification from the sender device 102, it can generate a message that indicates that the condition for the smart contract has been fulfilled. The message may include the first interaction identifier and the digital signature of the sender device 102. In some embodiments, a third hash key may be created by hashing data including the notification from the sender device, a timestamp associated with the notification, and the first interaction identifier. This third hash key can also be included in the message.

At step S238, the processor computer 112 can send the message to the blockchain network, and can inform the blockchain in the blockchain network 114 that the first interaction has been completed, that the condition(s) of the smart contract have been satisfied, and that the smart contract can end. The blockchain network 114 can then incorporate the details of the message into the blockchain to record the details.

In other embodiments, the smart contract could terminate on its own without an external communication from the processor computer 112. For example, if the condition is that a time period must pass before a condition is satisfied, then the smart contract may automatically expire and may notify all parties involved in the first interaction that the smart contract has expired. The process computer 112 may also check the balance of the receiver's digital account on the blockchain network 114.

At step S240, the processor computer 112 can notify the sender device 102 that the termination of the smart contract has been recorded to the blockchain in the blockchain network 114.

At step S242, the processor computer 112 can notify the receiver device 104 that the termination of the smart contract has been recorded to the blockchain in the blockchain network 114. The processor computer 112 may also inform the receiver of the receiver device 104 of the remaining balance (if any) that is remaining in the receiver's digital currency account. For example, if the first interaction amount was $500 and the second interaction amount was 100 digital dollars (assuming that 1 fiat dollar is equivalent to 1 digital dollar), then the receiver can be notified that the remaining balance is $400 or 400 digital dollars.

At step S244, the processor computer 112 can notify the authorizing entity computer 106 that various transfers of fiat currency should be made now that the first interaction has ended. For example, processor computer 112 may determine the amount of fiat currency that is equal to the remainder amount of digital currency in the receiver's digital currency account. The processor computer 112 could then instruct the authorizing entity computer 106 to transmit a push transaction message to the transport computer to push the amount of fiat currency to the account of the receiver at the transport computer 108. In some embodiments, the push transaction message can be an OCT or original credit transaction message which pushes funds from one party to another. OCT messages are described in detail in U.S. Pat. No. 8,851,366, which is assigned to the same assignee as the present application. In the above example, $400 would be pushed to the account of the receiver. Since the account of the receiver has been credited for the remainder amount and the condition has been fulfilled, the receiver of the receiver device 104 can then withdraw any funds from the account of the receiver managed by the transport computer 108.

The processor computer 112 could also instruct the authorizing entity computer 106 to transfer the difference between the interaction amount and the remainder amount via a push transaction message to an account of the processor computer 112. In the above example, $100 could be pushed to the account associated with the processor computer 112.

In other embodiments, in step S206 above, instead of requesting a hold on the account of the sender of the sender device 102, the processor computer 112 could request that the amount associated with the first interaction amount be transferred to an account of the processor computer 112. The account of the processor computer 112 could be managed by the authorizing entity computer, the transport computer 108, or some other computer. In such a situation, once the condition has been fulfilled and the termination of the smart contract is recorded on the blockchain in the blockchain network 114, the processor computer 112 could send a push transaction message for the remainder amount directly to the transport computer 108 (instead of via the authorizing entity computer 106).

Embodiments of the disclosure have a number of advantages. For example, in the above transaction processes, the receiver is able to conduct transactions using the funds that were provided by the sender in the first interaction and before the condition of the first interaction has been satisfied. If the receiver fails to satisfy the condition for any reason, any transactions that the receiver conducted are traceable and could be reversed, thus ensuring that the sender participating in the first interaction is not defrauded. For instance, if the receiver does not provide the service requested by the sender, then the digital account of the receiver could be debited for the first transaction amount and the processor computer could credit an account of the sender at the authorizing entity computer that holds the account of the sender.

Figure 3:
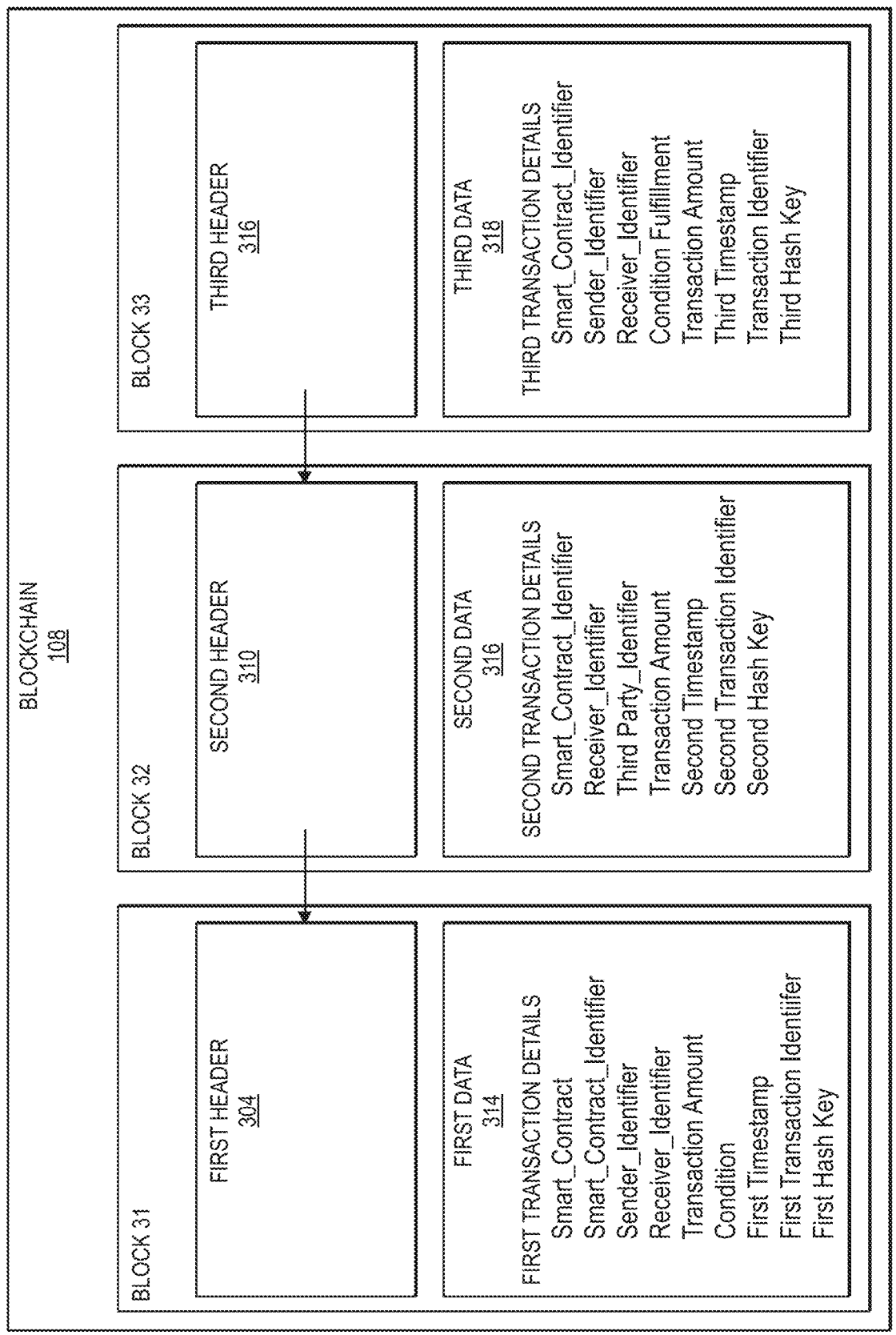
FIG. 3 shows a schematic diagram of a portion of a blockchain according to an embodiment.

FIG. 3 shows a block diagram of a portion of a blockchain according to an embodiment. Blockchain 108 may include a number of blocks 31, 32, 33, each block including respective headers 304, 310, and 316. Each header 304, 310, 316 may include data elements including version numbers, nonces, previous block hashes, Merkle roots, and timestamps. Each block may also include data 324, 326, 328 including information about each entity, an identifier for the entity, interaction amounts, etc.

The data included in each block of the blockchain 108 may include data for one or more user interactions. For the purposes of providing a simple explanation of the various embodiments, each of blocks 31, 32, and 33 is illustrated as containing data for one interaction. In practice, each block may contain data for many more interactions.

Data 314 of block 31 contains first transaction details for a first interaction between a sender and a receiver. The first transaction details may include, but is not limited to a smart contract, a transaction identifier or smart contract identifier, a sender identifier, a receiver identifier, an initial transaction amount, a condition for fulfilling the transaction, a first timestamp of when the first interaction starts, a first transaction identifier, and a first hash key.

Data 316 of block 32 contains data for a second interaction between a receiver and a third party. The second transaction details associated with the second interaction may include a smart contract identifier to link the source of the funds of the receiver to the smart contract in 314, a receiver identifier, a third party identifier, a transaction amount, a second timestamp, a second transaction identifier to identify the second interaction, and a second hash key.

Figure 4:
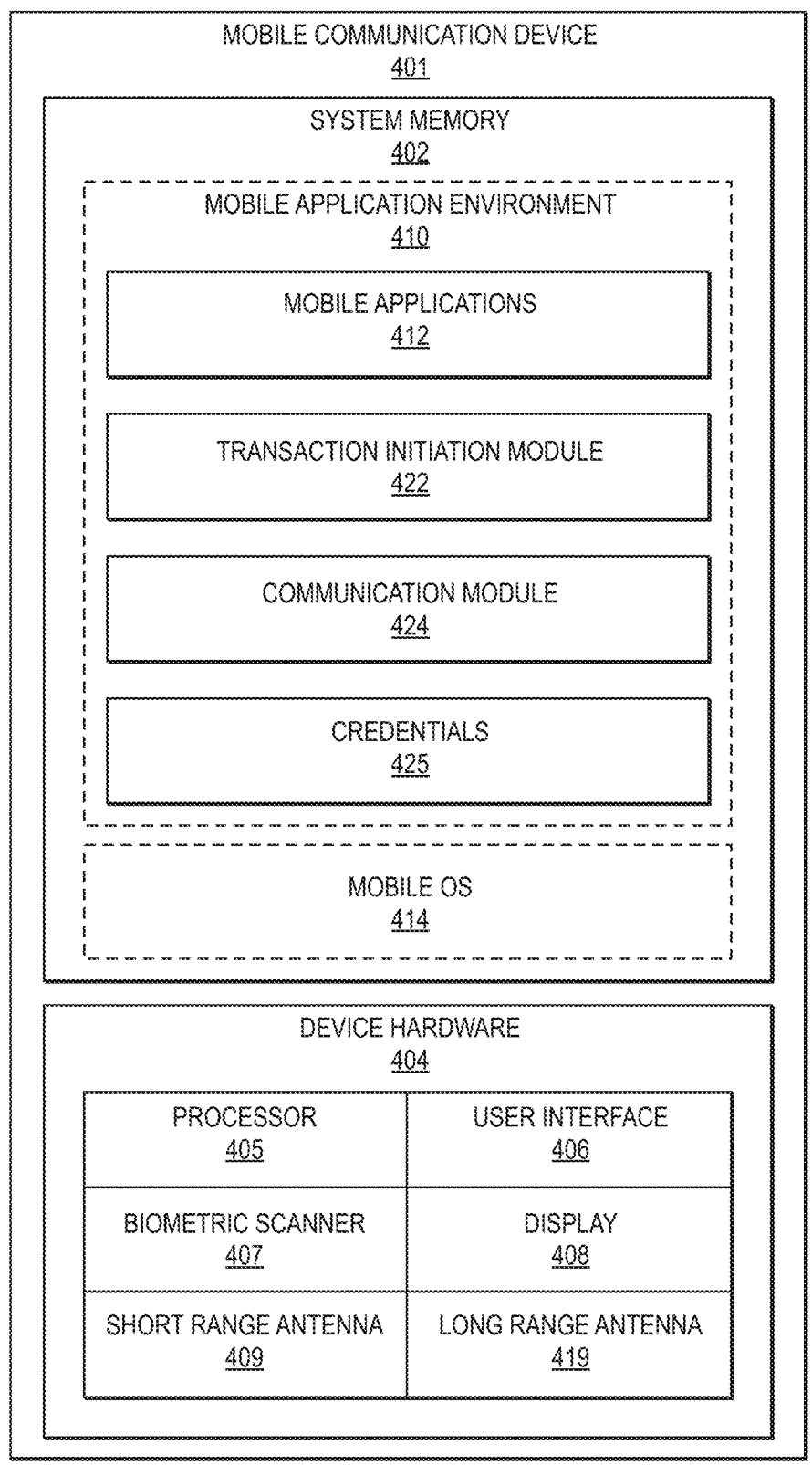
FIG. 4 shows a diagram of a mobile communication device according to an embodiment.

Data 318 of block 33 contains data for a third interaction between the receiver and the sender which indicates that the condition of the smart contract in 314 has been fulfilled. The transaction details may include a smart contract identifier, a sender identifier, a receiver identifier, an indication that the condition has been fulfilled, a third timestamp, a third transaction identifier, and a third hash key FIG. 4 illustrates a mobile communication device 401 according to an embodiment of the invention. The previously described sender device or receiver device can be the mobile communication device in FIG. 4. Mobile communication device 401 may include device hardware 404 coupled to a system memory 402.

Device hardware 404 may include a processor 405, a short range antenna 409, a long range antenna 419, a biometric scanner 407, a user interface 406, and a display 408 (which may be part of the user interface 406). The processor 406 can be implemented as one or more integrated circuits (e.g., one or more single core or multicore microprocessors and/or microcontrollers), and is used to control the operation of mobile communication device 401. The processor 405 can execute a variety of programs in response to program code or computer-readable code stored in the system memory 402, and can maintain multiple concurrently executing programs or processes.

The long range antenna 419 may include one or more RF transceivers and/or connectors that can be used by mobile communication device 401 to communicate with other devices and/or to connect with external networks. The user interface 406 can include any combination of input and output elements to allow a user to interact with and invoke the functionalities of mobile communication device 401, The biometric scanner 407 may be configured to capture any suitable biometric including a fingerprint, retina, facial image, etc. The short range antenna 409 may be configured to communicate with external entities through a short range communication medium (e.g. using Bluetooth, Wi-Fi, infrared, NFC, etc.). The long range antenna 419 may be configured to communicate with a remote base station and a remote cellular or data network, over the air.

The system memory 402 can be implemented using any combination of any number of non-volatile memories (e.g., flash memory) and volatile memories (e.g. DRAM, SRAM), or any other non-transitory storage medium, or a combination thereof media. System memory 402 may store a mobile OS 414 and a mobile application environment 410 where one or more mobile applications 412 reside (e.g., a payment application such as a mobile wallet application, merchant application, mobile location application, etc.) to be executed by the processor 405. Also, the system memory 402 may store computer code, executable by the processor 405, for performing any of the functions described herein.

The system memory 402 may also store a transaction initiation module 422, a communication module 424, as well as credentials 426, The transaction initiation module 422 may include instructions of code for receiving an input from a user such as via voice or touch screen. The communication module 204 may comprise code executable by the processor 405 for allowing the mobile communication device 401 to communicate with external entities.

System memory 402 may also store credentials 425, Credentials 425 may include information identifying the mobile communication device 401 and/or the user of the mobile communication device 401. Examples of credentials may include a public key associated with the mobile communication device 401 and/or a user of the mobile communication device 401, a digital signature (e.g., the public key of the mobile communication device 401 signed by a key of the authentication system), payment credentials such as PANs or payment tokens, biometric data (e.g., biometric samples or templates), etc.

Figure 5:
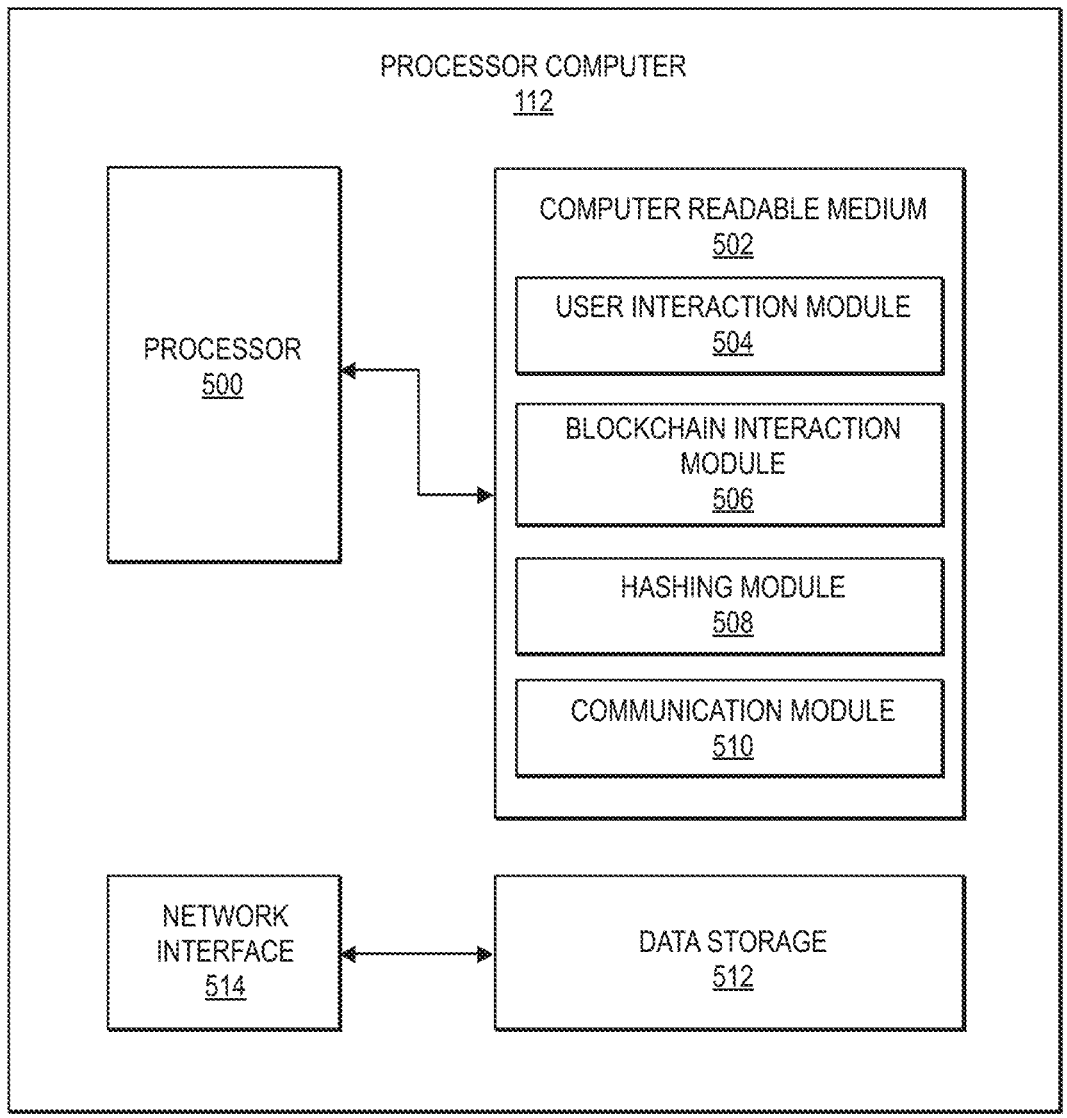
FIG. 5 shows a block diagram of a processor computer according to an embodiment.

FIG. 5 shows a block diagram illustrating some components in a processor computer 104 according to an embodiment. The processor computer 104 may have one or more processors 500, coupled to a non-transitory computer readable medium 502, data storage 512 and network interface 514.

The network interface 514 may include an interface that can allow the processor computer 104 to communicate with external computers. The network interface 514 may enable the digital identity computer 1000 to communicate data to and from another device such as a user device, relying party computer, identity provider computer, acquirer computer, key management computer, etc. Some examples of the network interface 1006 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 1006 may include Wi-Fi™. Data transferred via the network interface 1006 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 1006 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 502 may comprise a user interaction module 504, a blockchain interaction module 504, a hashing module 508, and a communication module 510.

The user interaction module 504 may comprise code, executable by the processor 500 for interacting with various user devices. The user interaction module 504 and the processor 500 can create identify users, and generate smart contracts that can be incorporated on a blockchain.

The blockchain interaction module 506 and the processor 560 can interact with a blockchain in a blockchain network. It can provide the data to the blockchain network that can be verified. If the processor computer 104 is part of the blockchain network, then the blockchain interaction module 506 can include code for causing the processor 500 to verify interactions prior to incorporation on a blockchain.

The computer readable medium 502 may comprise code, executable by the processor 500 to perform operations including a) receiving a first interaction request to transfer an interaction amount from a sender operating a sender device to a receiver operating a receiver device, the sender having a sender account at a sender financial institution and the receiver having a receiver account at a receiver financial institution, the first interaction request comprising a sender identifier associated with the sender, a receiver identifier associated with the receiver, and a first interaction amount, and a condition; b) generating a smart contract using the sender identifier, the receiver identifier, and the interaction amount, and the condition; c) hashing at least the sender identifier, the receiver identifier, the interaction amount, and the condition to form a first hash key; d) incorporating the smart contract, the sender identifier, the receiver identifier, and the interaction amount, the condition, and the first hash key into a first block in the blockchain; e) receiving a second interaction request from the receiver device, the second interaction request transferring a second interaction amount from the receiver to a third party, the second interaction request comprising the receiver identifier, a second interaction amount, and a third party identifier; f) hashing at least the receiver identifier, the third party identifier, and the second interaction amount, to form a second hash key; and g) incorporating the receiver identifier, the third party identifier, and the second interaction amount, and the second hash key into a second block in the blockchain, wherein steps e), f), and g) occur before the condition is fulfilled.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   a) receiving, by a computer, a first interaction request for a first interaction to transfer a first interaction amount from a sender operating a sender device to a receiver operating a receiver device, the first interaction request comprising a sender identifier associated with the sender, a receiver identifier associated with the receiver, and the first interaction amount, and a condition;
   b) generating, by the computer, a smart contract using the sender identifier, the receiver identifier, and the first interaction amount, and the condition, the smart contract comprising a smart contract identifier;
   c) hashing, by the computer, at least the sender identifier, the receiver identifier, the first interaction amount, and the condition to form a first hash key;
   d) incorporating, by the computer, the smart contract, the sender identifier, the receiver identifier, and the first interaction amount, the condition, and the first hash key into a first block in a blockchain;
e) receiving, by the computer, a second interaction request for a second interaction from the receiver device, the second interaction request transferring a second interaction amount from the receiver operating the receiver device to a third party operating a third party device, the second interaction request comprising the receiver identifier, the second interaction amount, and a third party identifier;
f) hashing, by the computer, at least the receiver identifier, the third party identifier, and the second interaction amount, to form a second hash key;
g) incorporating, by the computer, the receiver identifier, the third party identifier, and the second interaction amount, the smart contract identifier, and the second hash key into a second block in the blockchain;
h) executing, by the computer, prior to the condition being satisfied, the second interaction between the receiver device and the third party device; and
i) responsive to the condition being satisfied: (i) executing the first interaction between the sender device and the receiver device, and (ii) modifying the blockchain to reflect a completion of the smart contract included in the first block of the blockchain, wherein the blockchain is modified by incorporating at least the smart contract identifier, the sender identifier, the receiver identifier, and an indication that the condition is fulfilled into a third block in the blockchain, and
(iii) based on the modifying, transmitting a notification to the receiver device indicating completion of the smart contract, the notification including a balance of the receiver after execution of the first interaction and the second interaction, wherein the balance is computed as a difference between the first interaction amount and the second interaction amount.

2. The method of claim 1, wherein the condition is a time period.

3. The method of claim 1, further comprising:
generating, by the computer, a first interaction identifier for the first interaction, and hashing at least the sender identifier, the receiver identifier, the first interaction amount, the first interaction identifier, and the condition to form the first hash key.

4. The method of claim 1, wherein the condition includes receipt of a resource by the sender from the receiver.

5. The method of claim 1, wherein the condition includes the receiver performing an action for the sender.

6. The method of claim 1, further comprising:
communicating, by the computer, with a blockchain network maintaining the blockchain, that the condition has been fulfilled and that the smart contract is no longer active.

7. The method of claim 1, wherein the sender identifier is a sender public key.

8. The method of claim 1, wherein the blockchain comprises a plurality of blocks with a plurality of headers.

9. The method of claim 1, wherein the sender device is a mobile phone and the receiver device is a mobile phone.

10. A computer comprising:
a processor; and
a non-transitory computer readable medium, the non-transitory computer readable medium comprising code, executable by the processor for implementing operations comprising:
a) receiving a first interaction request for a first interaction to transfer a first interaction amount from a sender operating a sender device to a receiver operating a receiver device, the first interaction request comprising a sender identifier associated with the sender, a receiver identifier associated with the receiver, and the first interaction amount, and a condition;
b) generating a smart contract using the sender identifier, the receiver identifier, and the first interaction amount, and the condition, the smart contract comprising a smart contract identifier;
c) hashing at least the sender identifier, the receiver identifier, the first interaction amount, and the condition to form a first hash key;
d) incorporating the smart contract, the sender identifier, the receiver identifier, and the first interaction amount, the condition, and the first hash key into a first block in a blockchain;
e) receiving a second interaction request for a second interaction from the receiver device, the second interaction request transferring a second interaction amount from the receiver operating the receiver device to a third party operating a third party device, the second interaction request comprising the receiver identifier, the second interaction amount, and a third party identifier;
f) hashing at least the receiver identifier, the third party identifier, and the second interaction amount, to form a second hash key;
g) incorporating the receiver identifier, the third party identifier, and the second interaction amount, the smart contract identifier, and the second hash key into a second block in the blockchain;
h) executing, prior to the condition being satisfied, the second interaction between the receiver device and the third party device; and
i) responsive to the condition being satisfied: (i) executing the first interaction between the sender device and the receiver device, and (ii) modifying the blockchain to reflect a completion of the smart contract included in the first block of the blockchain, wherein the blockchain is modified by incorporating at least the smart contract identifier, the sender identifier, the receiver identifier, and an indication that the condition is fulfilled into a third block in the blockchain, and
(iii) based on the modifying, transmitting a notification to the receiver device indicating completion of the smart contract, the notification including a balance of the receiver after execution of the first interaction and the second interaction, wherein the balance is computed as a difference between the first interaction amount and the second interaction amount.

11. The computer of claim 10, wherein the condition is a time period.

12. The computer of claim 10, wherein the computer is a node in a blockchain network.

13. The computer of claim 10, wherein the condition includes receipt of a resource by the sender from the receiver.

14. The computer of claim 10, wherein the sender identifier is a sender public key.

15. The computer of claim 10, wherein the condition includes the receiver performing an action for the sender.

16. The computer of claim 10, wherein the blockchain comprises a plurality of blocks with a plurality of headers.

17. A system comprising:
a processor computer comprising
a processor, and a non-transitory computer readable medium, the non-transitory computer readable medium comprising code, executable by the processor for implementing operations comprising a) receiving a first interaction request for a first interaction to transfer a first interaction amount from a sender operating a sender device to a receiver operating a receiver device, the first interaction request comprising a sender identifier associated with the sender, a receiver identifier associated with the receiver, and the first interaction amount, and a condition, b) generating a smart contract using the sender identifier, the receiver identifier, and the first interaction amount, and the condition, the smart contract comprising a smart contract identifier, c) hashing at least the sender identifier, the receiver identifier, the first interaction amount, and the condition to form a first hash key, d) incorporating the smart contract, the sender identifier, the receiver identifier, and the first interaction amount, the condition, and the first hash key into a first block in a blockchain;

e) receiving a second interaction request for a second interaction from the receiver device, the second interaction request transferring a second interaction amount from the receiver operating the receiver device to a third party operating a third party device, the second interaction request comprising the receiver identifier, the second interaction amount, and a third party identifier;

f) hashing at least the receiver identifier, the third party identifier, and the second interaction amount, to form a second hash key;

g) incorporating the receiver identifier, the third party identifier, and the second interaction amount, the smart contract identifier, and the second hash key into a second block in the blockchain;

h) executing, prior to the condition being satisfied, the second interaction between the receiver device and the third party device; and i) responsive to the condition being satisfied: (i) executing the first interaction between the sender device and the receiver device, and (ii) modifying the blockchain to reflect a completion of the smart contract included in the first block of the blockchain, wherein the blockchain is modified by incorporating at least the smart contract identifier, the sender identifier, the receiver identifier, and an indication that the condition is fulfilled into a third block in the blockchain, and (iii) based on the modifying, transmitting a notification to the receiver device indicating completion of the smart contract, the notification including a balance of the receiver after execution of the first interaction and the second interaction, wherein the balance is computed as a difference between the first interaction amount and the second interaction amount.

18. The system of claim 17, further comprising:
a blockchain node comprising the blockchain.

* * * * *